United States Patent
Frasier et al.

(10) Patent No.: US 6,457,437 B1
(45) Date of Patent: Oct. 1, 2002

(54) CONSTANT VOLUME AIR FLOW RATE CONTROL FOR ANIMAL CAGE RACK VENTILATION SYSTEM

(75) Inventors: Daniel P. Frasier, Woburn; Gordon P. Sharp, Newton; Steve Tassini, Scituate, all of MA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/697,275

(22) Filed: Oct. 26, 2000

(51) Int. Cl.$^7$ ................................................. A01K 1/03
(52) U.S. Cl. ........................................................ 119/419
(58) Field of Search .................................. 119/417, 418, 119/419, 452, 455

(56) References Cited

U.S. PATENT DOCUMENTS

| | | | |
|---|---|---|---|
| 4,593,650 A | * | 6/1986 | Lattuada ...................... 119/419 |
| 4,989,545 A | | 2/1991 | Sheaffer ........................ 119/17 |
| 5,000,120 A | * | 3/1991 | Coiro, Sr. et al. ........... 119/419 |
| 5,042,429 A | * | 8/1991 | Deitrich et al. .............. 119/419 |
| 5,048,459 A | * | 9/1991 | Niki et al. .................... 119/455 |
| 5,385,505 A | | 1/1995 | Sharp et al. ................. 454/238 |
| 5,597,354 A | | 1/1997 | Janu et al. ................... 454/229 |
| 5,672,103 A | | 9/1997 | Jardinier ...................... 454/256 |
| 5,954,013 A | * | 9/1999 | Gabriel et al. .............. 119/419 |
| 6,029,698 A | | 2/2000 | Murray et al. ............... 137/601 |

OTHER PUBLICATIONS

Allentown Caging Equipment Co. Building Exhaust Connection Kit.
Allentown Caging Equipment Company.

* cited by examiner

Primary Examiner—Charles T. Jordan
Assistant Examiner—Elizabeth Shaw

(57) ABSTRACT

A rack system for holding a number of individual drawers or cages for laboratory or other animals has a plenum array for providing fresh air and removing stale or contaminated exhaust air from the drawers. A constant volume inlet valve and a constant volume outlet valve provide for stable air flow within each individual drawer while the exhaust air is expelled to a low pressure exhaust duct.

12 Claims, 1 Drawing Sheet

CONSTANT VOLUME AIR FLOW RATE CONTROL FOR ANIMAL CAGE RACK VENTILATION SYSTEM

BACKGROUND OF THE INVENTION

It goes without saying that laboratory animal such as rats and mice must be housed in a way that keeps them comfortable and healthy. Efforts are expended on them by highly trained lab personnel while performing experiments and tests, often over a long period of time. These expensive efforts make these animals individually extremely valuable. It is important both to be humane and to protect these investments that the animals have healthy and comfortable living space.

It is most convenient and cost effective to keep lab animals in high-density housing, but this has a number of consequences. High-density housing has the potential for contamination between individual animals, which can affect the outcome of experiments. High-density housing requires positive ventilation to provide uncontaminated air for breathing and to remove the heat, humidity, carbon dioxide, and other contaminants that these animals product simply in the course of existing. It is also important that humans be protected from the air exhausted from high-density lab animal housing. (This is true for lab animals in any kind of housing, but when animals are in high-density housing the potential for risk to nearby humans increases.)

U.S. Pat. Nos. 5,954,013 (Gabriel, et al.) and U.S. Pat. No. 4,989,545 (Sheaffer, et al.) both assigned to Lab Products Inc. for example show features of the current state of the art for high-density lab animal housing. '013 and '545 show such housing as comprising a rack storing several tens of drawers or cages in a side-by-side rectangular grid pattern. Each drawer has a floor, and back, side and front walls generally in the shape of a shoebox. Each drawer can be inserted into its operating position from a front side of the rack by sliding on guides into the rack. These guides support the drawer in its operating position.

Each drawer has an inlet for connection to an inlet plenum forming a part of the rack and providing pressurized fresh air. Each drawer typically has a discharge filter. The rack has an exhaust hood or shroud above each filter and connected to an outlet plenum that is also a part of the rack. The outlet plenum is held at a below ambient pressure by an exhaust fan, causing air within each drawer to flow through the filter to the shroud and into the outlet plenum. The pressures in the two plenums are controlled to maintain a desired pressure in each drawer. This prevents air within the drawers from reaching the ambient space where humans may be present even though there is no hermetic seal between the ambient space and the interior of the individual drawers when in their operating position. Each drawer typically houses one to five animals depending on the drawer size and the species.

The inlet plenum receives air from a blower and a HEPA filter. The exhaust plenum discharges to the ambient space, where a building exhaust system removes the exhausted air. One problem with exhausting to the ambient air is that humans sharing the space with the racks breathe air mixed with the air exhausted from the rack. Even if the exhaust air from the exhaust plenum is filtered, odors, heat, and gasses emanating from the animals remain in the filtered air. Alternatively, the exhaust can be connected directly to the building exhaust system. But in this case, varying pressures in the building exhaust system change the velocity of air passing through the drawers and affect the air temperature in the drawers. These changes can cause distress of the animals or at least affect their response to experimental activities, which may well raise questions about the validity of experiments using the animals as subjects. validity of experiments using the animals as subjects.

BRIEF DESCRIPTION OF THE INVENTION

The animal holding systems now in use can be modified to avoid some of these problems by including a constant volume inlet valve providing fresh air to the inlet plenum. The fresh air may be provided from a source at higher pressure than room ambient. Air within the outlet plenum flows through a constant volume outlet valve to the lower pressure of an exhaust duct of the building. The building exhaust duct then conveys the air from the animals in the rack to the outside.

DESCRIPTION OF THE PREFERRED EMBODIMENT

Figure 1:
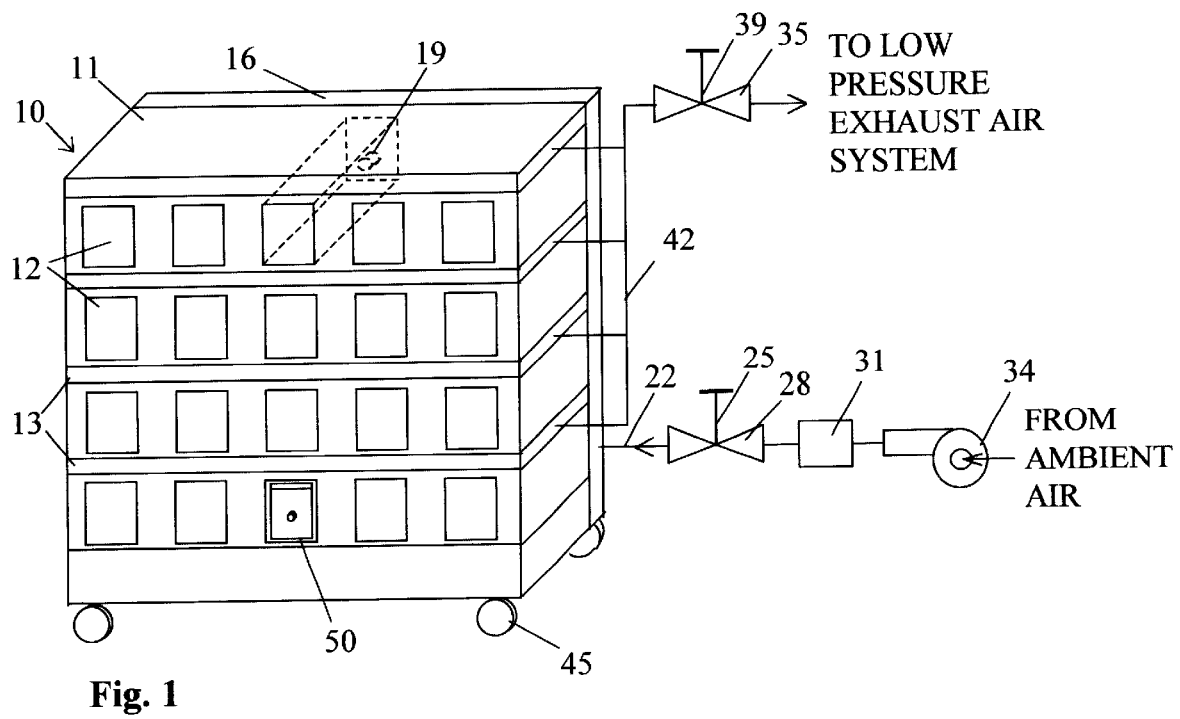
FIG. 1 shows a stylized version of a cage or drawer rack assembly suitable for holding a number of laboratory animals in humane and relatively constant conditions.

The rack assembly 10 of FIG. 1 has a rack 11 with a number of docking stations 12 for holding a number of individual cages or drawers 50. In FIG. 1 only one drawer 50 is shown installed in a docking station 12. The general arrangement of these rack assemblies is shown in more detail in the '013 and '545 patents cited earlier. Each drawer 50 is designed to hold one or more animals in relative isolation from animals in other of the drawers 50.

Figure 2:
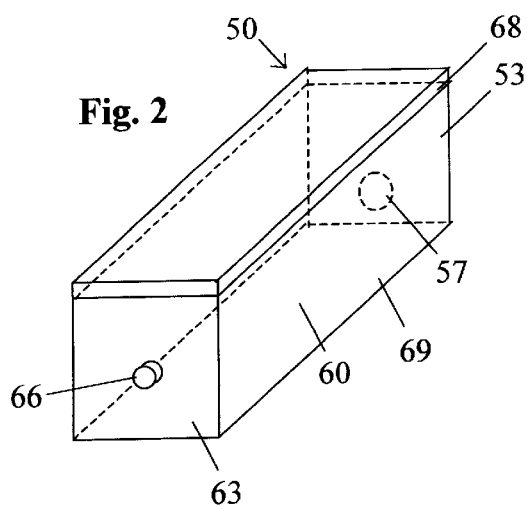
FIG. 2 shows a stylized version of an individual cage or drawer to be held by the rack assembly of FIG. 1.

An individual drawer 50 is shown in greater detail in FIG. 2 as having an approximate shoebox shape or form factor, with a floor 69, end wall 53, side walls 60 (only one of which has a reference number), and a front wall 63. End wall 53 has a ventilation air inlet 57 near its intersection with floor 60. A removable air filter 68 closes the top of each drawer 12. A handle or knob 66 allows each drawer 50 to be easily removed from the rack 11.

Rack 11 includes an inlet plenum 16 for supplying fresh filtered air to the individual drawers 50 through air connections 19, only one of which is shown in FIG. 1. Air connections 19 mate with inlets 57 when drawers 50 are installed in stations 12. An inlet plenum 16 receives fresh, filtered, pressurized air from a duct 22. A blower 34 receives ambient air and forces it through a HEPA filter 31 to an adjustable constant volume valve 28. Blower 34 may not be necessary if another way to provide pressure differential through rack 11 is provided. In this regard, the heating provided to the air by the animals may create sufficient convective force to provide the pressure differential required. Valve 28 supplies air at nearly a constant volume rate to duct 22 so long as volume adjustment 25 remains unchanged. A control element within valve 28 modifies resistance to airflow as pressure drop across valve 28 changes. U.S. Pat. No. 5,385,505, issued to Sharp et al. on Jan. 31, 1995, shows one type of self-actuating, venturi-type constant volume flow control valve or damper with a spring-controlled throttling element that we find suitable for this application. "Self-actuating" in this context means that no source of external power is required for its operation. Upon selecting the position of volume adjustment 25 the volumetric air flow rate over a substantial range of pressure differentials from inlet to outlet of such a valve 28 remains constant. Some types of constant volume flow control valves do not have adequate flow control stability for this application. Changing the position of adjustment 25 changes this constant volumetric flow rate.

Each row of stations 12 has immediately above it an outlet plenum 13. The outlet plenums 13 are positioned immediately above the filter element 68. Air enters outlet plenum 13 from drawers 50 and also, as explained in the '013 patent, through a narrow gap between each plenum 13 and the filter element 68. Air within each plenum 13 is exhausted through an exhaust duct network 42 through an adjustable constant volume air valve 35 to a low pressure exhaust air system, typically a part of the building's HVAC system. Valve 35 is similar to valve 28, and has a similar volume adjustment 39 and internal control element. Valve 35 also may have the structure shown in the '505 patent. The stale or contaminated air from plenums 13 is discharged outside of the building. The air pressure within each plenum 13 is maintained slightly below the ambient pressure by the exhaust air system.

In operation the volumetric flow through valve 28 is adjusted to provide adequate ventilation for the assembly 10. Valve 35 is adjusted to pass in most cases a substantially greater amount of air than valve 28, this excess amount being supplied by leakage inflow adjacent to the individual drawers 50. Although the ratio of flow rates to which valve 28 and valve 35 are set can vary, typically valve 35 should be set to allow two to three times the flow rate of valve 28. Certainly the flow rate of valve 35 should be in most cases substantially greater than the flow rate of valve 28. The ratio selected depends on the amount of inherent leakage into the space within rack 11 around the peripheries of individual drawers 50. As previously explained, the preference is for little or no air actually flowing through the drawers 50 to escape to the ambient space. This means that the internal pressure within the rack 11 space must be held lower than the lowest expected ambient pressure.

The constant volumetric flow through valves 28 and 35 decouples assembly 10 from varying air pressures on both the inlet and outlet sides and maintains the pressure within the rack 11 space lower than the ambient pressure regardless of pressure variations within both the low pressure exhaust system and the ambient pressure. Obviously, the exhaust air system must maintain a pressure within the rack system 10 that is lower than the ambient pressure. In fact, it turns out for systems similar to rack assembly 10 that stack effect or convective flow driven by the warmth of the animals is adequate at least for short periods of time to allow suitable flow rates. With the arrangement shown, air movement within each drawer 50 is relatively stable regardless of change in pressure at the inlet of valve 28 and change in the pressure at the outlet of valve 35. This creates stable and similar living conditions for the animals housed within the drawers 50 regardless of the position of a particular drawer 50 in the rack 11 or even with fewer than all of the drawers 50 in rack 11, allowing experimenters to minimize external influences that might affect experimental results.

The preceding describes out invention. The following claims define what we wish to protect by Letters Patent.

What is claimed is:

1. In a animal holding system of the type having a rack having a plurality of openings, each opening for receiving at least one drawer for at least one animal, each said drawer having a plurality of walls and a floor defining a holding space for the animal, at least one of said walls having an inlet for receiving air from an inlet plenum of the rack, said drawer having an outlet for routing air from the holding space to an outlet plenum of the rack for connection to an exhaust system, said rack having a plurality of docking stations, each station configured to mate one drawer's inlet to the inlet plenum and one drawer's outlet to the outlet plenum, said system including:

a) a constant volume inlet valve for connection to a fresh air source, and providing fresh air from the source to the inlet plenum; and b) a constant volume outlet valve receiving air from the outlet plenum, for connection to a low pressure exhaust duct.

2. The system of claim 1 wherein the inlet and outlet valves are each adjustable for a preselected volume rate of flow.

3. A method for using the system of claim 2, comprising the steps of a) adjusting the inlet valve to a preselected volumetric flow rate; and b) adjusting the outlet valve to a preselected volumetric flow rate substantially greater than the inlet valve's flow rate.

4. The method of claim 3, including the step of adjusting the outlet valve's volumetric flow rate to a value approximately two to three times the volumetric flow rate of the inlet valve.

5. The system of claim 2, wherein each valve is a self-actuating, venturi-type, constant volume flow control valve with a spring-controlled throttling element.

6. A method for using the system of claim 2, comprising the steps of a) adjusting the inlet valve to a preselected volumetric flow rate; and b) adjusting the outlet valve to a volumetric flow rate greater than the inlet valve's flow rate.

7. The method of claim 6, including the step of adjusting at least one of the inlet and outlet valves to create a volumetric flow rate through the outlet valve at least two times the volumetric flow rate through the inlet valve.

8. The system of claim 1, wherein each valve is a self-actuating, venturi-type, constant volume flow control valve.

9. The animal holding system of claim 1 including a blower providing pressurized air to the inlet valve.

10. The animal holding system of claim 9 including an air filter interposed between the blower and the inlet valve.

11. In a animal holding system of the type having a rack having a plurality of openings, each opening for receiving at least one drawer for at least one animal, each said drawer having a plurality of walls and a floor defining a holding space for the animal, at least one of said walls having an inlet for receiving air from an inlet plenum of the rack, said drawer having an outlet for routing air from the holding space to an outlet plenum of the rack for connection to an exhaust system, said rack having a plurality of docking stations, each station configured to mate one drawer's inlet to the inlet plenum and one drawer's outlet to the outlet plenum, said system including:

a) a fan for providing fresh air to the inlet plenum; and b) a constant volume outlet valve receiving air from the outlet plenum, for connection to a low-pressure exhaust duct.

12. The system of claim 11 wherein the outlet valve is adjustable for a preselected volume rate of flow.

* * * * *